United States Patent [19]
Masuda et al.

[11] Patent Number: 5,415,115
[45] Date of Patent: May 16, 1995

[54] MACHINE OF THE TYPE PLACED ON THE GROUND FOR TRANSPLANTING A SERIES OF POTTED SEEDLINGS

[75] Inventors: Akiyoshi Masuda; Ryuzo Tsuru; Tetsuo Nanbu, all of Obihiro, Japan

[73] Assignee: Nihon Tensaiseito Kabushiki Kaisha, Tokyo, Japan

[21] Appl. No.: 54,191

[22] Filed: Apr. 30, 1993

[30] Foreign Application Priority Data

May 8, 1992 [JP] Japan .................... 4-142080

[51] Int. Cl.$^6$ ........................... A01C 11/02
[52] U.S. Cl. ................... 111/105; 111/106; 111/111; 111/199
[58] Field of Search ........... 111/100, 101, 104, 105, 111/106, 107, 108, 109, 111, 114, 199

[56] References Cited

U.S. PATENT DOCUMENTS

| | | | |
|---|---|---|---|
| 4,106,415 | 8/1978 | Häkli | 111/111 |
| 4,130,072 | 12/1978 | Dedolph | 111/105 |
| 4,132,337 | 1/1979 | Masuda et al. | 111/109 |
| 4,133,274 | 1/1979 | Orth et al. | 111/114 |
| 4,167,911 | 9/1979 | Masuda et al. | 111/105 |
| 4,231,186 | 11/1980 | Ruuska | 111/105 |
| 4,253,411 | 3/1981 | Shulzhenko et al. | 111/105 |
| 4,597,343 | 7/1986 | Nambu | 111/111 |
| 4,644,880 | 2/1987 | Branch | 111/3 |
| 4,970,972 | 11/1990 | Williames | 111/111 |

FOREIGN PATENT DOCUMENTS

| | | | |
|---|---|---|---|
| 284877 | 10/1988 | European Pat. Off. | 111/105 |
| 550821 | 7/1993 | European Pat. Off. | 111/105 |
| 738515 | 12/1932 | France | 111/111 |
| 581912 | 8/1933 | Germany | 111/105 |
| 849197 | 9/1952 | Germany | 111/105 |
| 38-25715 | 12/1938 | Japan . | |
| 54-28321 | 9/1979 | Japan . | |
| 55-30805 | 8/1980 | Japan . | |
| 63-61866 | 11/1988 | Japan . | |
| 888840 | 12/1981 | U.S.S.R. | 111/105 |

*Primary Examiner*—Eric K. Nicholson
*Attorney, Agent, or Firm*—Oliff & Berridge

[57] ABSTRACT

A machine for transplanting potted seedlings grown in a series of pots linked together without separating them from one another includes a bottom plate having an upwardly curved leading end portion, and a slot formed in its trailing end portion. A soil opener is fitted in the slot and contains a vertically rotatable pot guide. A pair of soil drawing members are attached to the bottom plate behind the soil opener. A pair of side frames are erected on the bottom plate, and have inwardly directed portions converging toward the soil opener. A pair of pot guides are also provided on the bottom plate inwardly of the side frames.

11 Claims, 4 Drawing Sheets

MACHINE OF THE TYPE PLACED ON THE GROUND FOR TRANSPLANTING A SERIES OF POTTED SEEDLINGS

BACKGROUND OF THE INVENTION

1. Field of the Invention

This invention relates to a machine of the type placed on the ground which holds a series of pots linked together and each containing a seedling grown therein, and delivers the pots one after another from one end thereof for transplantation without separating the pots from one another, or from the seedlings.

2. Description of the Prior Art

A method which is widely used for transplanting seedlings employs square or hexagonal pots made of a thin material, such as paper. The pots are filled with soil, seeds are sown in the soil, seedlings are grown from the seeds under controlled sprinkling of water, and the potted seedlings are transplanted to a patch. There are two types of pots as classified by use for transplantation. A multiplicity of pots linked together for growing seedlings are separated into the individual pots prior to transplantation as disclosed in Japanese Patent Publication No. 25715/1963, or are supplied for transplantation in a chain without being separated from one another as disclosed in Japanese Patent Publication No. 30805/1980.

The decrease of manual labor has recently become essential in agriculture, too, as a result of the decrease in agricultural population, and the advance of ages of people engaging in agriculture. In this connection, the successive transplantation of seedlings by the latter type of pots has drawn attention, as it enables the fully automatic transplantation of seedlings by a machine.

There are known a number of transplanting machines. For example, Japanese Patent Publication No. 30805/1980 discloses a transplanting machine which includes two pairs of rotating members for holding two successive pots, respectively, which are linked together by a connecting material having a cut formed therein. The rotating members holding the preceding pot are rotated at a peripheral speed which is higher than that of the rotating members holding the following pot, whereby the connecting material is pulled and torn apart at its cut to enable the pots to be separated from each other for transplantation.

Japanese Patent Publication No. 61866/1988 discloses a transplating machine which includes a rotating disk having radially extending transplanting rods for holding a pot therebetween. When the disk is rotated to move the pot forward, a stop member is caused to act upon another, or the following pot linked to the preceding pot by a connecting material having a cut formed therein, whereby the connecting material is pulled and torn apart at its cut to enable the pots to be separated from each other for transplantation.

Japanese Patent Publication No. 28321/1979 discloses a series of pots linked together by a different connecting material having no such cut as described above. It is a decay-resistant string bonded to the centers of every two adjoining pots by a water-resistant paste, and having between every two adjoining pots a loose length which is equal to the distance between the seedlings to be transplanted. The string links the pots together in a multiplicity of rows, and every two adjoining rows of pots are bonded to each other by a water-soluble paste. The same publication also discloses a transplanting machine of the traction type which is movable on wheels contacting the ground for delivering the pots one after another from a platform, while allowing the string to be stretched between every two adjoining pots, and transplanting the potted seedlings successively without separating the pots from one another in the soil dug by a soil opener attached to the rear end of the platform.

The known machines, however, have drawbacks. The machine disclosed in Japanese Patent Publication No. 30805/1980 is adapted for handling relatively small pots and transplanting potted seedlings, such as of beets, at a spacing of 23 to 25 cm. The machine disclosed in Japanese Patent Publication No. 61866/1988 is adapted for handling relatively large pots and transplanting potted seedlings, such as of lettuce or cabbage, at a spacing of 30 to 45 cm. These machines are capable of transplanting potted seedlings at a spacing which is not smaller than, say, 10 cm, and are, therefore, incapable of transplanting potted seedlings of vegetables such as spinach and garland chrysanthemums, for which a transplanting spacing of 4 to 8 cm is usually appropriate. Moreover, a still smaller and simpler machine is desired for transplanting potted seedlings in a small area of land, as in a greenhouse.

The machine disclosed in Japanese Patent Publication No. 28321/1979 has a high platform level due to its wheels. Therefore, it is suitable for transplanting potted seedlings linked together by a loose and flexible material such as the string described above, but is not suitable for handling pots linked together by a material which forms an integral part of the pots, and is not loose or flexible, as disclosed in Japanese Patent Publication No. 30805/1980, since there is a limit to the angle at which the pots can properly be delivered from the platform to the ground. Any attempt to deliver the pots at a greater angle is very likely to cause the falling down of the pots or the breakage of the connecting material, and result in the interruption of any further delivery of the pots and thereby of transplantation work. The delivery of the pots within the limited angle is not always satisfactory, since it is likely that, as each pot is required to travel a longer distance from the high platform level to the ground, it may show a greater resistance to movement and thereby cause the connecting material to break.

SUMMARY OF THE INVENTION

Under these circumstances, it is an object of this invention to provide a transplanting machine which is simple in construction and light in weight, and can be operated manually without the aid of any special motive power for transplanting a series of potted seedlings even at a spacing of less than 10 cm by employing simple and inexpensive pots linked together by a simple connecting material having no cut formed therein.

This object is essentially attained by a transplanting machine which comprises a bottom plate having an upwardly curved leading end portion, a trailing end portion having a slot formed therein, and a pair of parallel longitudinal edges extending between the leading and trailing ends of the bottom plate, the slot lying on the longitudinal centerline of the bottom plate, and having an open outer end at the trailing end of the bottom plate and a closed inner end; a pair of side frames erected on the bottom plate symmetrically with respect to the longitudinal centerline thereof, each of the side frames having a first portion attached to the bottom plate along one of its longitudinal edges, a second portion attached to the bottom plate along one of the longitudinal edges of the slot, and a third portion extending from the first portion to the second portion at an angle to the longitudinal centerline of the bottom plate, the third portions having therebetween a distance gradually decreasing toward the slot, the bottom plate and the first and third portions of the side frames defining a space for holding potted seedlings to be transplanted; a soil opener attached to the bottom plate below its slot; a pot guide located in the soil opener rotatably for inclination at a variable angle; a pair of parallel soil drawing members attached to the bottom plate behind the soil opener and having therebetween an open space aligned with the soil opener; and a handle attached to the first portions of the side frames.

The machine may further include a pair of transversely spaced apart blades projecting downwardly from the bottom plate. The blades adapt the machine for use on a ridge between furrows in a patch.

The machine may further include a pair of pot guides each situated inwardly of the third, or inwardly directed portion of one of the side frames.

The machine may further include a pair of counterbalances provided on the bottom plate outwardly of the third, or inwardly directed portions of the side frames, respectively, and on the opposite sides, respectively, of the slot.

The machine may further include a device connected between the side frames and the handle for adjusting the height of the handle.

The machine of this invention is simple in construction, and can, therefore, be fabricated at a low cost. The machine is light in weight, and its bottom plate has a substantially flat bottom surface, and is, therefore, easy to slide on the surface of a patch. The machine is, therefore, easy to move manually only if the handle is pulled. The side frames serve as a guide for the travel of the machine in a furrow, while the blades serve as a guide for the travel of the machine on a ridge, so that the machine may travel with high stability. Thus, the machine of this invention contributes greatly to realizing a decrease of labor and an improvement of efficiency in the work of transplantation.

Other features and advantages of this invention will become apparent from the following description and the accompanying drawings.

DETAILED DESCRIPTION OF THE INVENTION

Figure 1:
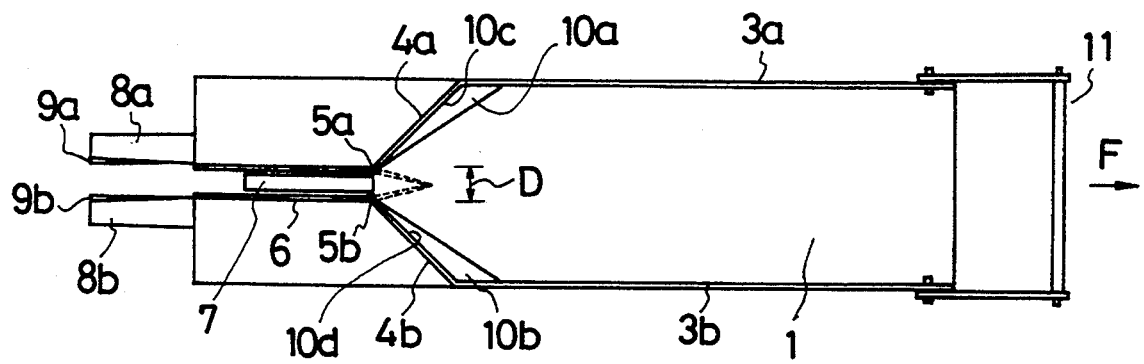
FIG. 1 is a top plan view of a transplanting machine embodying this invention.
Figure 2:
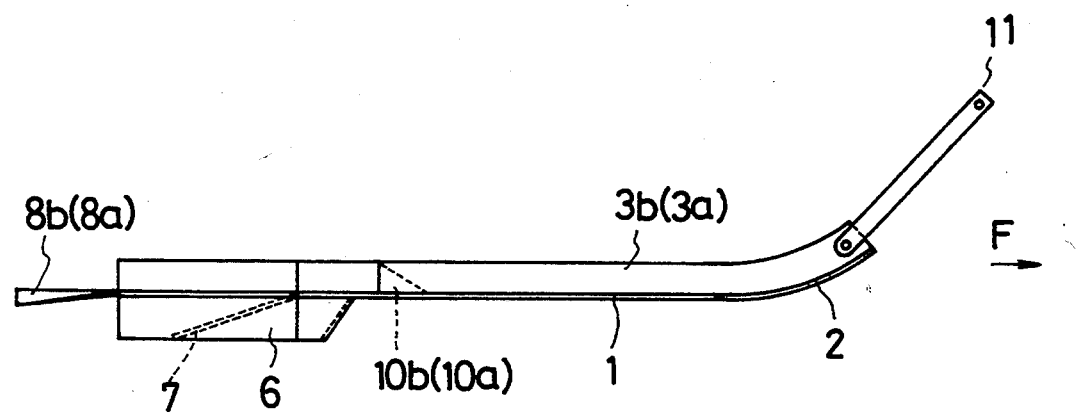
FIG. 2 is a side elevational view of the machine shown in FIG. 1.
Figure 3:
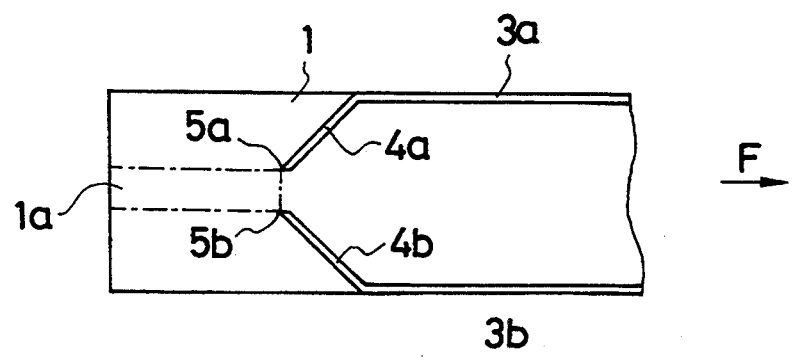
FIG. 3 is a fragmentary view showing a part of the machine shown in FIG. 1.

A transplanting machine embodying this invention is shown in FIGS. 1 to 4. The machine includes a rectangular bottom plate 1 having an upwardly curved leading end portion 2 toward its leading end as viewed in the direction of machine travel which is shown by an arrow F, and a pair of transversely spaced apart side frames 3a and 3b erected on the bottom plate 1 and extending longitudinally thereof. The upwardly curved leading end portion 2 of the bottom plate 1 facilitates the sliding movement of the machine on the ground, or the surface of soil on which it is placed for transplantation. The bottom plate 1 has a trailing end portion having a slot 1a (FIG. 3) formed therein. The slot 1a lies on the longitudinal centerline of the bottom plate 1, and has an outer end which opens at the trailing end of the bottom plate 1, and an inner end located intermediate the leading and trailing ends of the bottom plate and closer to its trailing end. Each side frame 3a or 3b consists of a first portion extending along one of the longitudinal edges of the bottom plate 1, a second portion extending along one of the longitudinal edges of the slot 1a, and a third portion 4a or 4b extending from the first portion to the second portion at an angle to the longitudinal centerline of the bottom plate 1. The side frames 3a and 3b are symmetric to each other with respect to the longitudinal centerline of the bottom plate 1. The third portions 4a and 4b thereof are inwardly directed from the first to the second portions, and have therebetween a distance gradually decreasing toward the slot 1a, and ceasing to decrease at the junctions 5a and 5b between the second portions and the third portions 4a and 4b. The distance D between the third portions 4a and 4b at the junctions 5a and 5b is equal to the distance between the second portions of the side frames 3a and 3b, or the width of the slot 1a, which terminates at the junctions 5a and 5b as shown by broken lines in FIG. 3. The side frames 3a and 3b may be straight as shown, or may be slightly curved.

Figure 4:
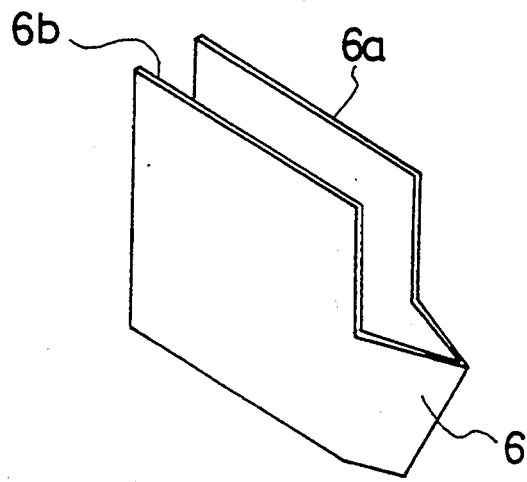
FIG. 4 is a perspective view of a soil opener.

The machine also includes a soil opener 6 fitted in the slot 1a of the bottom plate 1. The soil opener 6 is formed by a pair of parallel upright walls 6a and 6b, as shown in FIG. 4. The walls 6a and 6b have portions projecting above the bottom plate 1, and portions projecting below it. The wall portions projecting below the bottom plate 1 form a forwardly projecting extension having a V-shaped cross section and defining a sharp edge, as shown in FIG. 4. The sharp edge enables the soil opener 6 to dig soil easily. The soil opener 6 is open around its periphery except at its sharp edge. The wall portions projecting above the bottom plate 1 define the side frames 6a and 6b continuous to the side frames 3a and 3b respectively.

A pot guide 7 is provided in the soil opener 6 for facilitating the transfer of pots to the surface of the soil in which potted seedlings are to be transplanted. The pot guide 7 has a base end secured adjacent to the inner end of the slot 1a of the bottom plate 1, and a free end which is rotatable vertically about its base end to enable the inclination of the pot guide 7 at a variable angle to the ground.

A pair of parallel soil drawing members 8a and 8b are attached to the trailing end of the bottom plate 1, and are spaced apart from each other to define therebetween an open space which is aligned with the inner space of the soil opener 6. The soil drawing members 8a and 8b are twisted as shown at 9a and 9b, respectively, to produce an improved soil drawing effect. The soil drawing members 8a and 8b may be formed as parts independent of the bottom plate 1, or as integral parts thereof.

A handle 11 is attached to the side frames 3a and 3b at the leading end of the machine. The handle 11 comprises a pair of arms fixed to the side frames 3a and 3b, respectively, and a grip member connected between the arms, as shown in FIG. 1.

The machine further includes a pair of pot guides 10a and 10b provided inwardly of the inwardly directed portions 4a and 4b of the side frames 3a and 3b, respectively, for keeping pots in their upright positions for proper transfer into the soil opener 6. Each pot guide 10a or 10b is an inclined plate extending along the side frame portion 4a or 4b, and having a gradually increasing angle of inclination toward the soil opener 6. Each pot guide 10a or 10b has an upper edge 10c or 10d located substantially at the same level of height with the upper edge of the side frame portion 4a or 4b, and a lower edge 10e or 10f secured to the upper surface of the bottom plate 1.

Figure 7:
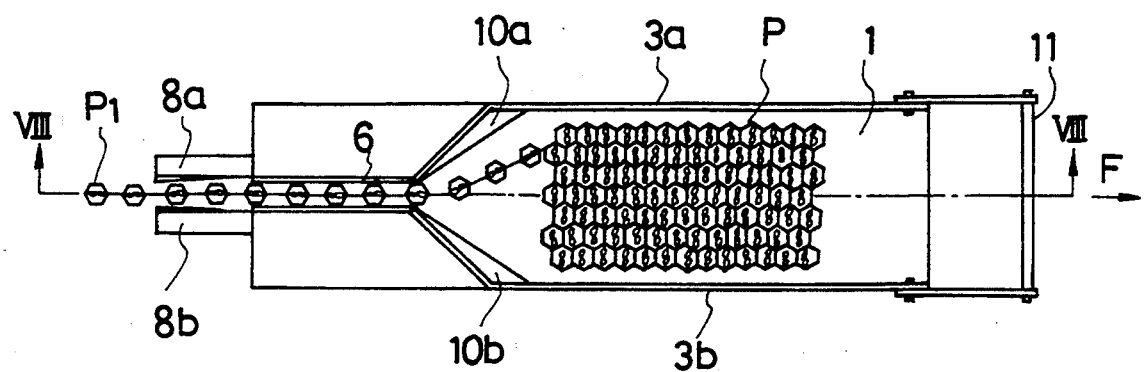
FIG. 7 is a top plan view showing the transplanting operation of the machine shown in FIG. 1.
Figure 8:
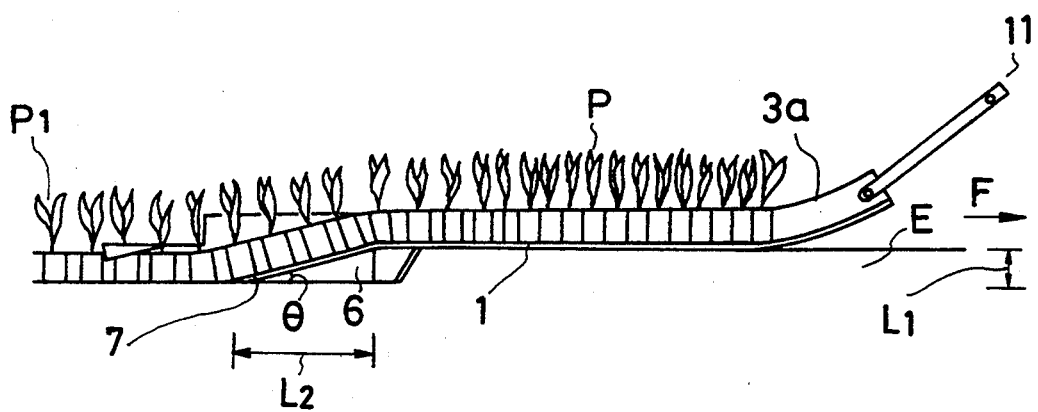
FIG. 8 is a sectional view taken along the line VIII—VIII Of FIG. 7.

Attention is now directed to FIGS. 7 and 8 showing by way of example the mode in which the machine as hereinabove described is used for the successive transplantation of potted seedlings. The machine is placed on a flat soil surface E, as shown in FIG. 8, and a group of pots P are placed on the bottom plate 1 surrounded by the side frames 3a and 3b. The group consists of 40 rows of seven pots each, or a total of 280 pots, though only a part thereof is shown. Each pot has a long diameter of 30 mm and a height of 50 mm. The pots are linked together by a connecting material having a width of 50 mm, and having no cut formed therein. Every two adjoining rows of pots are bonded together by a water-soluble paste.

The handle 11 is pulled manually to move the machine forward by a distance of several tens of centimeters in the direction of the arrow F, whereby a transplanting furrow is made by the soil opener 6. The first pot P1 to be transplanted is pulled out into the furrow through the soil opener 6, and set in the soil drawn around it.

The furrow has a depth $L_1$ of 50 mm which is equal to the height of the pot. There is a horizontal distance $L_2$ of 340 mm between the inlet of the soil opener 6 at which the pot is delivered onto the inclined pot guide 7, and the lower end of the pot guide 7 from which the pot is delivered onto the soil in the furrow. The pot guide 7 is inclined at an angle of 10° to the horizontal. This angle falls within the limit of 15° which has experimentally been found acceptable.

The handle 11 is pulled again to move the machine forward. As the machine is moved forward, the pots are delivered onto the pot guide 7 and through the soil opener 6 one after another without being separated from one another, and are placed in the furrow dug by the soil opener 6, and set in the soil drawn around them by the soil drawing members 8a and 8b. Even if any pot may fall down on the bottom plate 1, it is raised before entering the soil opener 6 upon contacting the pot guide 10a or 10b having a gradually increasing angle of inclination toward the inlet of the soil opener 6.

Figure 5:
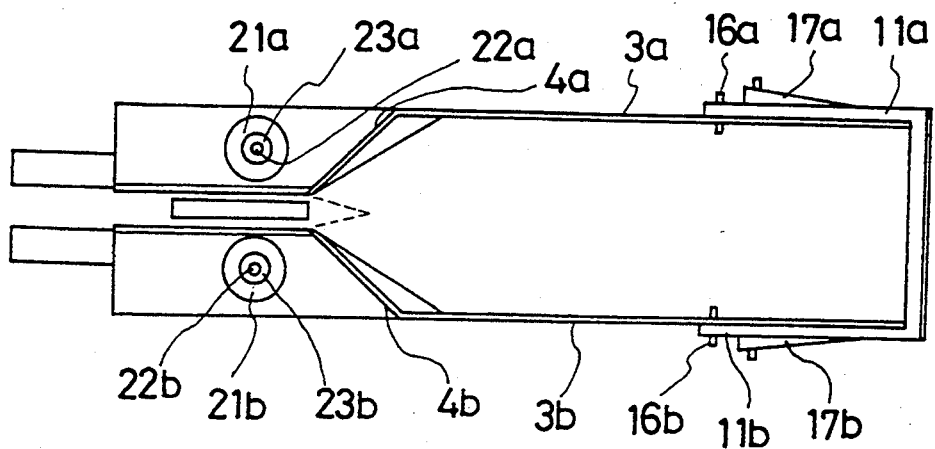
FIG. 5 is a top plan view of a modified form of machine embodying this invention.
Figure 6:
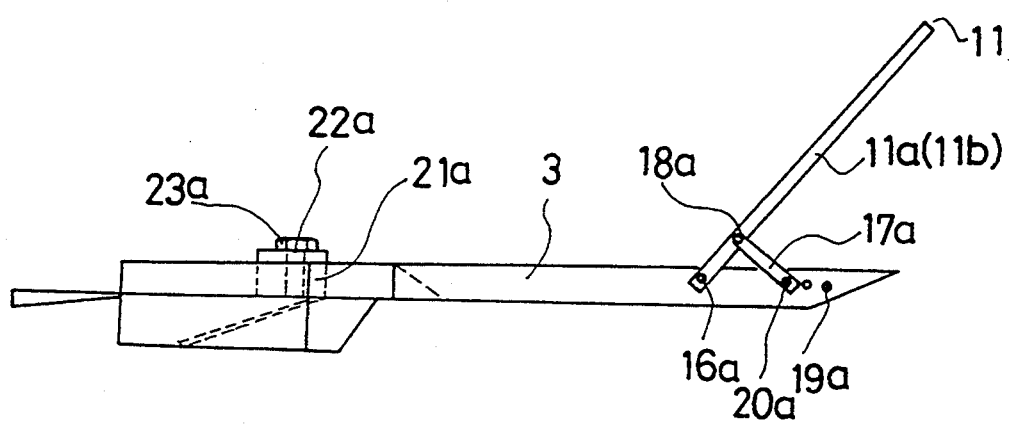
FIG. 6 is a side elevational view of the machine shown in FIG. 5.

Reference is now made to FIGS. 5 and 6 showing a modified form of machine embodying this invention. It is basically identical in construction to the machine as hereinabove described with reference to FIGS. 1 to 4, and no repeated description is, therefore, made of any feature common to both forms of machines. The modified form of machine has a handle 11 which is adjustable in height to suit a person who operates the machine. The handle 11 comprises a pair of arms 11a and 11b, and a grip member connected therebetween. Each arm 11a or 11b has a base end joined rotatably to one of the side frames, 3a or 3b, by a pin 16a or 16b. A pair of adjusting rods 17a and 17b are connected between the side frames 3a and 3b and the arms 11a and 11b. Each adjusting rod 17a or 17b has one end joined rotatably to one of the arms, 11a or 11b, by a pin 18a or 18b, while the other end thereof is joined to one of the side frames, 3a or 3b, by a screw 20a or 20b extending through the rod into one of a series of appropriately spaced apart holes 19a or 19b formed in the side frame between the base end of the arm and the leading end of the machine. If the screws 20a and 20b are shifted from one pair of transversely spaced apart holes 19a and 19b to another, it is possible to change the angle of inclination of the arms 11a and 11b to the side frames 3a and 3b, and thereby the height of the handle 11. The same result can be obtained if an appropriately elongated slot is formed in each side frame instead of the holes 19a or 19b, though no such slot is shown.

The modified form of machine further includes a pair of transversely spaced apart counterbalances 21a and 21b provided on the bottom plate 1 outwardly of the inwardly directed portions 4a and 4b of the side frames 3a and 3b, respectively, and on the opposite sides, respectively, of the slot 1a. Each counterbalance 21a or 21b is fitted about a round bar 22a or 22b upstanding from the bottom plate 1, and having a threaded upper end portion about which a nut 23a or 23b is engaged to hold the counterbalance 21a or 21b in position. As the work of transplantation proceeds, there is every likelihood that a balance of weight may be lost between the leading and trailing end portions of the machine, resulting in the rising of its trailing end portion above the ground and thereby the failure of the machine to continue the proper delivery of pots for transplantation. The counterbalances 21a and 21b can effectively overcome any such problem and maintain the trailing end portion of the machine in contact with the patch surface. The counterbalances 21a and 21b may usually have a weight of, say, 2 to 10 kg, though it depends on the size of the pots employed.

Figure 9:
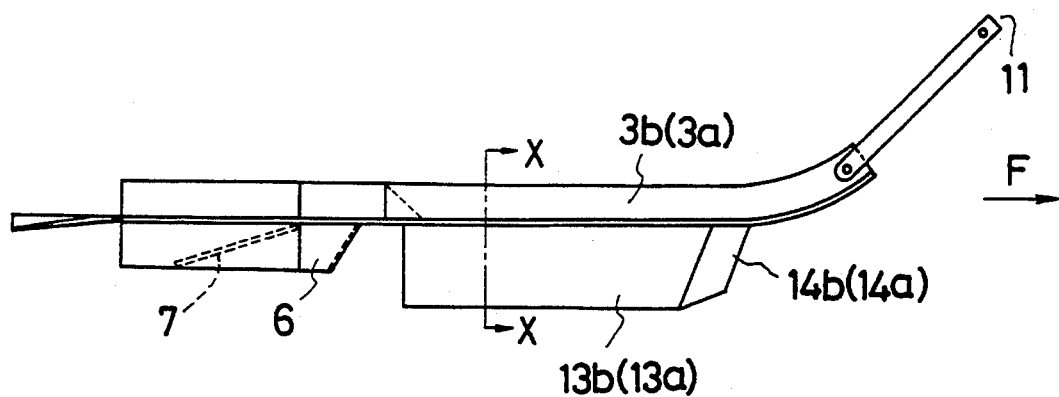
FIG. 9 is a side elevational view of another modified form of machine embodying this invention.
Figure 10:
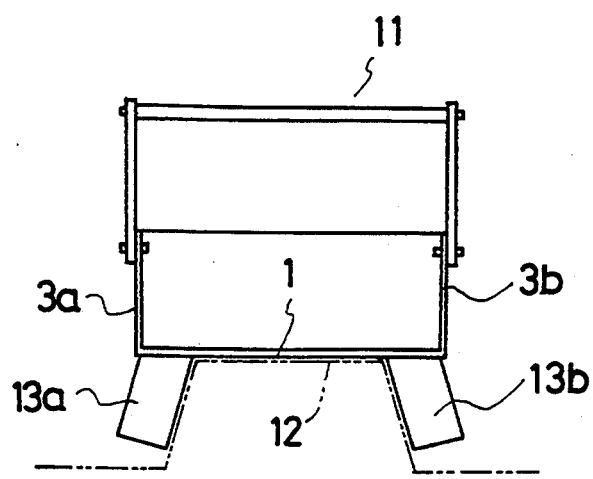
FIG. 10 is a sectional view taken along the line X—X of FIG. 9.

Another modified form of machine embodying this invention is shown in FIGS. 9 and 10. It is basically identical in construction to the machine as hereinbefore described with reference to FIGS. 1 to 4, and no repeated description is, therefore, made of any feature common to both forms of machine. The modified form of machine includes a pair of transversely spaced apart legs or blades 13a and 13b projecting downwardly from the bottom plate 1 between the soil opener 6 and the leading end of the machine. The blades 13a and 13b are so shaped and positioned as to suit the contour of a ridge 12 between furrows in a patch, as shown in FIG. 10. Each blade 13a or 13b has a laterally outwardly bent front end portion 14a or 14b close to the leading end portion of the machine, and thereby facilitates the travel of the machine along the ridge 12. The blades 13a and 13b hold the machine in position on the ridge 12 throughout the successive transplantation of potted seedlings.

Figure 11:
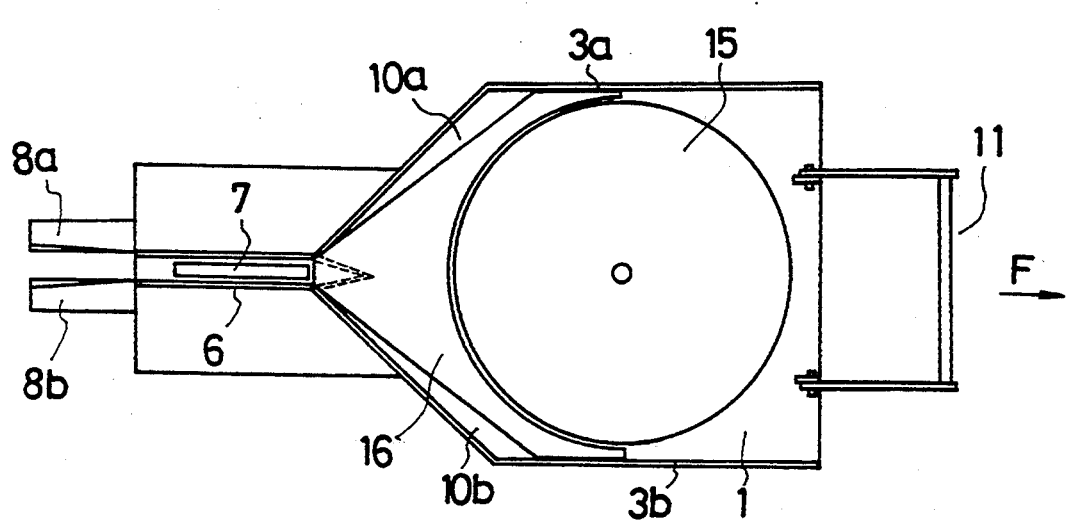
FIG. 11 is a top plan view of still another modified form of machine embodying this invention.

Reference is finally made to FIG. 11 showing still another modified form of machine embodying this invention. It is substantially identical or similar in construction to the machine as hereinbefore described with reference to FIGS. 1 to 4, and no repeated description is, therefore, made of any common or similar feature. The modified form of machine includes a rotary disk 15 supported rotatably on the bottom plate 1 surrounded by the side frames 3a and 3b for supporting thereon a roll of pots linked together. It further includes a generally V-shaped plate 16 placed on the bottom plate 1 between the side frames 3a and 3b and the rotary disk 15. The plate 16 has a semicircular inner edge extending along a half of the peripheral edge of the disk 15 in close proximity to it, and a pair of mutually converging outer edges each contacting the side frame 3a or 3b and the pot guide 10a or 10b. The plate 16 is equal in thickness to the disk 15, and thereby eliminates the difference in height between the bottom plate 1 and the disk 15 and ensures the proper transfer of pots from the disk 15 to the soil opener 6. The same result can be obtained if the disk 15 is formed with a downwardly sloping surface along its peripheral edge, though not shown.

What is claimed is:

1. A machine of the type placed on the ground for transplanting a series of potted seedlings grown in a multiplicity of pots linked together, said machine comprising:

a bottom plate having an upwardly curved leading end portion, a trailing end portion having a slot formed therein, and a pair of parallel longitudinal edges extending between the leading and trailing ends of said bottom plate, said slot lying on a longitudinal centerline of said bottom plate, and having an outer end open at said trailing end and an inner end terminating intermediate said ends;

a pair of side frames erected on said bottom plate symmetrically with respect to said centerline thereof, each of said side frames having a first portion attached to said bottom plate along one of said longitudinal edges, a second portion attached to said bottom plate along one of the longitudinal edges of said slot, and a third portion extending from said first to said second portion at an angle to said centerline, said third portions having therebetween a distance gradually decreasing toward said slot, said bottom plate and said first and third portions of said side frames defining a space for holding potted seedlings;

a soil opener attached to said bottom plate below said slot;

a pot guide positioned in said soil opener rotatably for inclination at a variable angle;

a pair of parallel soil drawing members attached to said bottom plate behind said soil opener and having therebetween an open space aligned with said soil opener; and a handle attached to said side frames adjacent to said leading end.

2. A machine as set forth in claim 1, further including a pair of transversely spaced apart blades projecting downwardly from said bottom plate, and adapted for holding the machine in position on a ridge between furrows.

3. A machine as set forth in claim 1, further including a pair of pot guides each situated inwardly of said third portions of said side frames.

4. A machine as set forth in claim 3, further including a pair of counterbalances provided on said bottom plate outwardly of said third portions of said side frames, respectively, and on the opposite sides, respectively, of said slot.

5. A machine as set forth in claim 4, further including means connected between said side frames and said handle for adjusting the height of said handle.

6. A machine as set forth in claim 5, wherein said handle comprises a pair of transversely spaced apart arms, and a grip member connected between said arms, each of said arms being joined rotatably to one of said side frames, said means comprising a pair of adjusting rods each having one end joined rotatably to one of said arms, while the other end thereof is removably attached to one of said side frames.

7. A machine as set forth in claim 1, further including a disk supported rotatably on said bottom plate for supporting said potted seedlings thereon.

8. A machine as set forth in claim 2 further comprising a pair of pot guides, each situated inwardly of one of said third portions of said side frames.

9. A machine as set forth in claim 8, further comprising a pair of counterbalances provided on said bottom plate outwardly of said second portions of said side frames, and on opposite sides of said slot.

10. A machine as set forth in claim 9, further comprising means for adjusting the height of said handle, said means connected between said side frames and said handle.

11. A machine as set forth in claim 10, wherein said handle comprises:

a pair of spaced apart arms; and a grip member connected between said arms, each of said arms being joined rotatably to one of said side frames, and wherein said means for adjusting the height of said handle comprises a pair of adjusting rods, each of said rods having one end rotatably attached to one of said arms and another end removably attached to one of said side frames.

* * * * *